United States Patent [19]
Satoh

[11] Patent Number: 5,583,938
[45] Date of Patent: Dec. 10, 1996

[54] IMAGE SIGNAL SCRAMBLING APPARATUS AND DESCRAMBLING APPARATUS

[75] Inventor: Akira Satoh, Tokyo, Japan

[73] Assignee: NEC Corporation, Japan

[21] Appl. No.: 346,778

[22] Filed: Nov. 30, 1994

[30] Foreign Application Priority Data

Dec. 1, 1993 [JP] Japan ................................. 5-329980

[51] Int. Cl.$^6$ .................................................. H04N 7/167
[52] U.S. Cl. ................................ 380/20; 380/10; 380/49
[58] Field of Search ................................ 380/9, 10, 5, 20, 380/46, 49

[56] References Cited

U.S. PATENT DOCUMENTS

| | | | |
|---|---|---|---|
| 5,208,857 | 5/1993 | Lebrat | 380/10 |
| 5,377,266 | 12/1994 | Katta et al. | 380/20 |
| 5,515,395 | 5/1996 | Tsutsui | 380/34 |
| 5,515,437 | 5/1996 | Katta et al. | 380/20 |
| 5,521,978 | 5/1996 | Oguro | 380/20 |

*Primary Examiner*—David C. Cain
*Attorney, Agent, or Firm*—Ostrolenk, Faber, Gerb & Soffen, LLP

[57] ABSTRACT

An object of the invention is to provide an image scrambling apparatus and an image descrambling apparatus capable of making a communication of secrecy by scrambling a digital image signal as well as variable-length-encoding the digital image signal.

A transmitting apparatus 1 DCT-encodes an image signal V2 from an A/D converter 11 by means of a DCT encoder 12, and outputs signals of D1, D2, D3, D4, and the number of zero-runs D5. When it variable-length-encodes the D2 to D5 through a variable-length encoder 13 and outputs V3, it generates a series of PN signals K2 by means of a PN generator 18 on the basis of a PN initial value K1 from a PN initial value generator 17, adds the scalar quantumizing number D1 and K2 to each other by means of an adder 19 and outputs the scrambled D1, and then gives a scrambled image signal V4 through compositing the V3 and the D1.

8 Claims, 2 Drawing Sheets

IMAGE SIGNAL SCRAMBLING APPARATUS AND DESCRAMBLING APPARATUS

BACKGROUND OF THE INVENTION

1. Field of the Invention

The present invention relates to an image signal scrambling apparatus and a descrambling apparatus, and more particularly to an image signal scrambling apparatus and a descrambling apparatus applied to an image signal coding apparatus used for a broadcasting satellite and a communication satellite, which utilizes a discrete cosine transform (DCT) coding method and a variable-length-coding method.

2. Description of the Prior Art

Up to now, as shown in FIG. 2, a system for transmitting and receiving an image signal coded by means of DCT coding and variable-length-coding comprises a transmitting apparatus 101, a receiving apparatus 102, and a satellite communication path 3. The transmitting apparatus 101 includes an A/D converter 11 for converting an analog image signal V1 to a digital image signal V2, a DCT encoder 12 for encoding the converted digital image signal V2 and outputting encoded signals of a scalar quantumizing number D1, a block type D2, a motion compensation vector D3, effective data D4, and the number of zero-runs D5, a variable length-encoder 13 for variable-length-encoding the encoded signals D2, D3, D4 and D5 (except the scalar quantumizing number D1) by means of a Huffmann code system, a framing circuit 14 for framing a variable-length-encoded image signal V3 and a scalar quantumizing number D1 to form a scrambled image signal v4, a buffer memory 15 for temporarily storing the scrambled image signal V4' composed by the framing circuit 14 and permitting a change in the processing speed by controlling the amount of information generated, and another framing circuit 116 for framing the image signal V4' from the buffer memory 15 and voice data A into a composite image signal D7' and outputting the composite signal D7' onto a transmission path. The image signal, compressed by means of DCT encoding and variable-length-encoding in the transmitting apparatus 101, is transmitted to the receiving apparatus 102 through a satellite path 3.

The receiving apparatus 102 includes a deframing circuit 121 for separating the composite signal D7' into the image signal V4' and voice data A, a buffer memory 22 for temporarily storing the image signal V4', permitting a change in processing speed, another deframing circuit 23 for separating the image signal V4' stored in the buffer memory 22 into a scalar quantumizing number D1 and a variable-length-encoded image signal V3 and outputting those separated signals, a variable-length decoder 24 for giving a block type D2, a motion compensation vector D3, effective data D4, and the number of zero-runs D5 by variable-length-decoding the variable-length-encoded image signal V3 by means of the Huffmann code system, a DCT decoder 25 for making those variable-length-decoded data D2, D3, D4 and D5 and the scalar quantumizing number D1 into a digital image signal V2' through run-length, scalar-quantumizing, predictive-transform, and DCT decoding processes, and a D/A converter 26 for converting the DCT-decoded digital image signal V2' into an analog image signal V1'.

Since the above-described transmitting apparatus and receiving apparatus of coded digital image signals using DCT encoded and variable-length-encoding as described above do not have a signal encrypting function, it is not possible to make a communication service chargeable or provide an encrypted communication in a cable transmission service, a satellite broadcasting service, and the like.

SUMMARY OF THE INVENTION

An object of the invention is to provide an image signal scrambling apparatus and descrambling apparatus capable of making a cryptic communication by scrambling a digital image signal as well as DCT-encoding and variable-length-encoding the digital image signal.

An image signal scrambling apparatus according to the invention comprises a DCT-encoding means for receiving and encoding a digitized image signal and outputting a scalar quantumizing number signal and a plurality of encoded image signals including a block type signal, a motion compensation vector signal, an effective data signal, and a number of zero-runs signal, a variable-length-encoding means for receiving and variable-length-encoding the encoded image signals and outputting a variable-length-encoded image, an initial value generating means for generating an arbitrary PN initial value, a PN generating means for generating a series of PN signals based on the PN initial value, an adding means for adding the series of PN signals to the scalar quantumizing number signal and outputting a scrambled scalar quantumizing number signal, and a first framing means for composing the variable-length-encoded image signal and the scrambled scalar quantumizing number signal, thereby encrypting the image signal, producing a composite image signal.

An image signal descrambling apparatus according to the invention comprises a first deframing means for separating and extracting at least a scrambled image signal and a PN initial value from a received composite image signal, a second deframing means for separating the scrambled image signal into a scrambled scalar quantumizing number that has a series of PN signals added to it and a variable-length-encoded image signal, a variable-length-decoding means for variable-length-decoding the variable-length-encoded image signal, a series-of-PN-signals generating means for generating a series of PN signals based on its PN initial value, an adding means for adding the scalar quantumizing number and the series of PN signals to each other and outputting a scalar quantumizing number from which a series of PN signals have been removed, and a DCT-decoding means for DCT-decoding the encoded image signal and the scalar quantumizing number.

In the image signal scrambling apparatus of the invention, the series of PN signals are generated on the basis of an arbitrary PN initial value, a plurality of signals are made from a digital image signal including a scalar quantumizing number and an encoded image, the series of PN signals are added to the scalar quantumizing number forming a scrambled scalar quantumizing number, the encoded image, comprising a block type, a motion compensation vector, effective data, and the number of zero-runs, is variable-length-encoded, and the variable-length-encoded image signal and the scrambled scalar quantumizing number signal are framed, and therefore the image signal processed by the framing process is encrypted, i.e., given secrecy. If the PN initial value is encrypted and the encrypted initial value and the image signal are framed, the degree of secrecy of the image signal is further increased.

The above-mentioned encrypted composite image signal can be converted to a descrambled image signal by separating and extracting the PN initial value from the received composite signal, removing the series of PN signals from the scrambled scalar quantumizing number, variable-length-decoding the variable-length-encoded image signal, and DCT-decoding the resulting encoded signals.

DESCRIPTION OF THE PREFERRED EMBODIMENT

Figure 1:
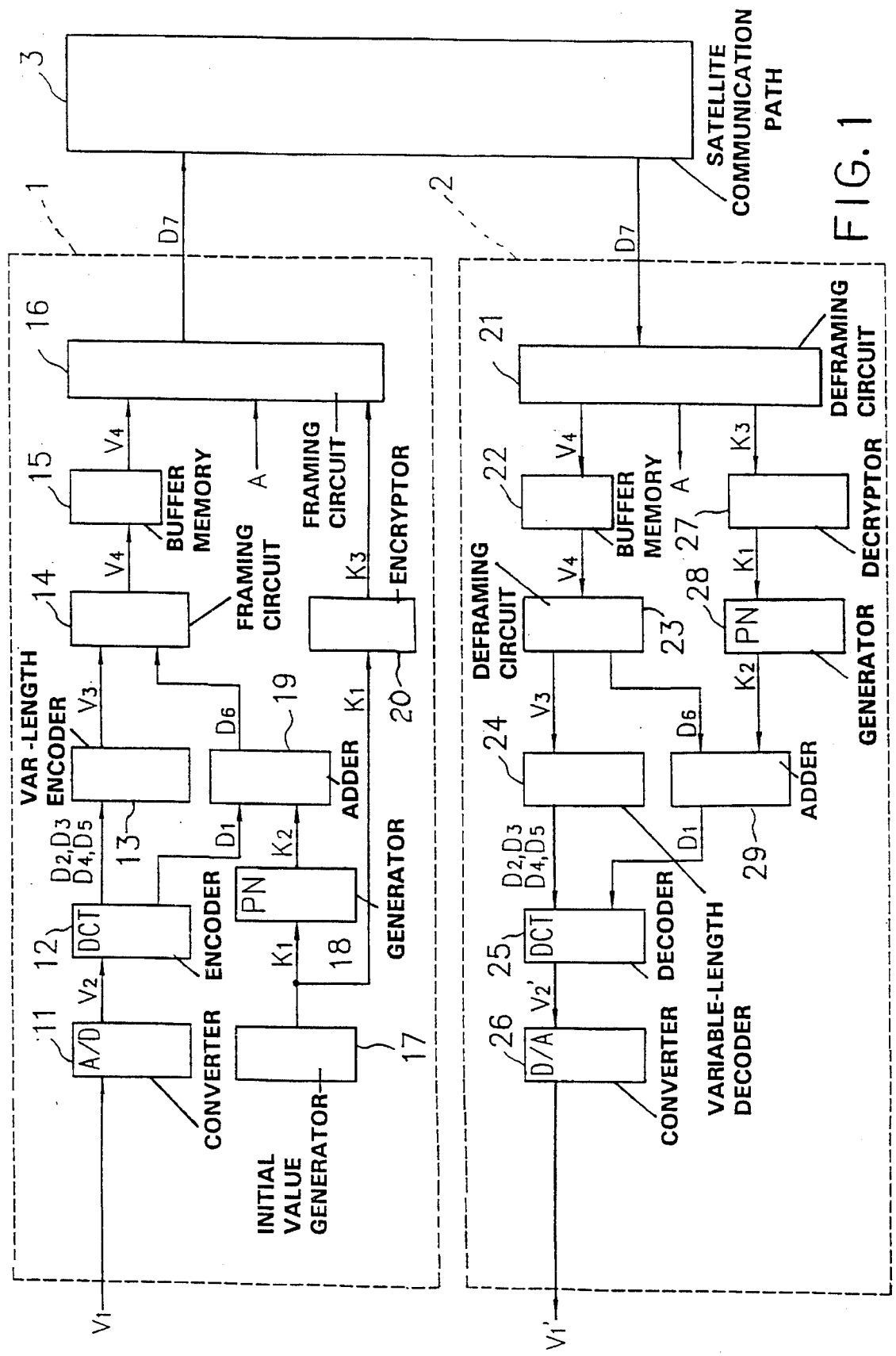
FIG. 1 is a block diagram showing an embodiment of an image signal scrambling apparatus and descrambling apparatus according to the present invention.
Figure 2:
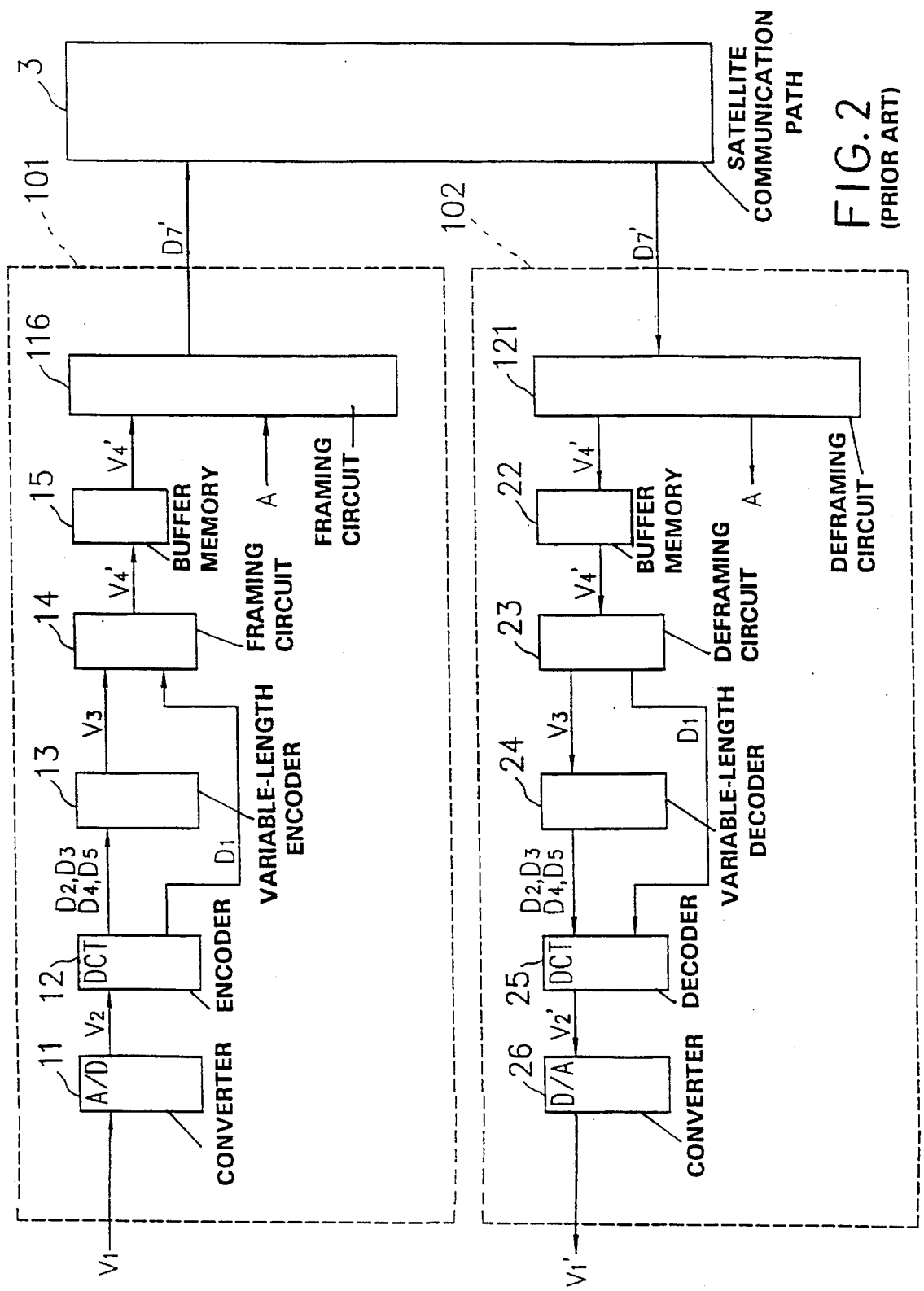
FIG. 2 is a block diagram showing an example of composition of an existing digital image signal compression and decompression system of the prior art utilizing a broadcasting satellite or communication satellite.

Referring to FIG. 1 showing an embodiment of a digital image signal compression apparatus and a digital image signal decoding apparatus according to the present invention, a transmitting apparatus 1 converts an analog image signal V1 to a digital image signal V2, DCT-encodes the digital image signal V2 to form a scalar quantumizing number D1 and an encoded image comprising a block type D2, a motion compensation vector D3, an effective data D4 and a number of zero-runs D5, generates an initial value K1, generates a series of PN signals K2, adds the series of PN signals K2 to the scalar quantumizing number D1 forming a scrambled scalar quantumizing number D6, variable-length-encodes the encoded image D2, D3, D4 and D5 forming a variable-length-encoded image signal V3, frames the variable-length encoded image signal V3 together with the scrambled scalar quantumizing number D6, forming a scrambled image signal V4, encrypts the initial value K1 forming an encrypted initial value K3, and outputs a composite image signal D7 obtained by framing the scrambled image signal V4 a voice signal A and the encrypted initial value K3. The composite image signal D7 is transmitted via a satellite communication line and received by a receiving apparatus 2. After its encrypted PN initial value has been decrypted, the composite image signal D7 is decompressed and decoded into the digital image signal and converted to an analog image signal V1'.

Details of the above-mentioned transmitting apparatus 1 and receiving apparatus 2 are described in the following. The transmitting apparatus 1 comprises an A/D converter 11, a DCT encoder 12 for compressing an image signal, a variable-length encoder 13, first and second framing circuit 14 and 16 for framing two or more signals, a buffer memory 15 for smoothing the signal processing processes, an initial value generator 17 for generating an initial value for scrambling, a PN generator 18, an adder 19, and an encryptor 20. These are described in greater detail below.

The A/D converter 11 is a circuit that converts an analog image signal V1 to a digital image signal V2. The DCT encoder 12 is a circuit which processes the digital image signal V2 by the processes of DCT encoding, predictive transform, scalar quantumizing, run-length encoding, and the like, and outputs signals of a scalar quantumizing number D1, and an encoded image comprising a block type D2, a motion compensation vector D3, effective data D4, and the number of zero-runs D5. The variable-length encoder 13 circuit receives the encoded image D2, D3, D4, and D5 and outputs a variable-length encoded image signal V3 encoded by means of a Huffmann code system.

The initial value generator 17 generates an initial value K1. The PN generator 18 generates a series of PN signals K2 from the initial value K1. The adder 19 scrambles together the scalar quantumizing number D1 and the series of PN signals K2, and outputs a scrambled scalar quantumizing number D6. The encryptor 20 converts the initial value K1 used in generating the series of PN signals V2 into an encrypted initial value K3.

The first framing circuit 14 frames the variable-length encoded image signal V3 and the scrambled scalar quantumizing number D6, and outputs a scrambled image signal V4. The buffer memory 15 is a storage for temporarily storing the scrambled image signal V4 facilitating a change in processing speed by controlling the amount of information to be generated. The second framing circuit 16 frames the scrambled image signal V4, voice data A, and the encrypted initial value K3 into a composite image signal D7.

The receiving apparatus 2 comprises a first and second deframing circuit 21 and 23, a buffer memory 22, a variable-length decoder 24, a DCT decoder 25, a D/A converter 26, a decryptor 27, a PN generator 28, and an adder 29.

The first deframing circuit 21 separates the composite image signal D7 transmitted from the transmitter side into a scrambled image signal V4, voice data A, and an encrypted initial value K3. The buffer memory 22 temporarily stores the scrambled image signal V4 to facilitate changing processing speeds. The second deframing circuit 23 separates the scrambled image signal V4 into a variable-length-encoded image signal V3 and a scrambled scalar quantumizing number D6. The variable-length decoder 24 accepts the variable-length-encoded image signal V3 as an input and variable-length-decodes it by means of a Huffmann code system, outputting an encoded image comprising a block type D2, a motion compensation vector D3, effective data D4, and the number of zero-runs D5.

The decryptor 27 decrypts the encrypted initial value K3 outputting the initial value K1. The PN generator 28 receives the initial value K1 and generates a series of PN signals K2. The adder 29 adds the series of PN signals K2 and the scrambled scalar quantumizing number D6 to each other and outputs the scalar quantumizing number D1, descrambled by the addition.

The DCT decoder 25 DCT-decodes the scalar quantumizing number D1, and the encoded image D2, D3, D4, and D5, and outputs a digital image signal V2'. The D/A converter 26 converts the digital image signal V2' into an analog image signal V1' and outputs the analog image signal V1'.

The transmitter side as described above converts an analog image signal V1 to a digital image signal V2 through the A/D converter 11, and applies processes of DCT, predictive transform, scalar quantumizing, and run-length encoding to the digitized image signal V2 by means of the DCT encoder 12. The DCT encoder 12 outputs the data processed by these processes as a scalar quantumizing number D1, and an encoded image comprising a block type D2, a motion compensation vector D3, effective data D4, and the number of zero-runs D5. The encoded image D2, D3, D4, and D5 output from the DCT encoder 12 is the input to the variable-length encoder 13, which produces a variable-length-encoded image signal V3 that is variable-length-encoded by means of a Huffmann code system.

The initial value generator 17 generates an initial value K1, and the PN generator 18 generates a series of PN signals K2, using the initial value K1. The adder 19 adds the scalar quantumizing number D1 and the series of PN signals K2 by adding them to each other, and outputs the scrambled scalar quantumizing number D6. The encryptor 20 converts the initial value K1 used in generating the PN signals into an encrypted initial value K3 through an encrypting process.

The first framing circuit 14 frames the variable-length-encoded image signal V3 and the scrambled scalar quantumizing number D6 into a scrambled image signal V4, and outputs the scrambled image signal V4 to a buffer memory 15. The buffer memory 15 temporarily stores the scrambled image signal V4, controlling the amount of information to be generated, thus facilitating changes in processing speed. The second framing circuit 16 frames the scrambled image signal V4, the encrypted initial value K3, and voice data A into a composite image signal D7, and outputs the composite image signal D7 for transmission. The composite image signal D7 is transmitted to the receiver side, e.g., through the satellite communication path 3.

The receiver side separates the composite data D7 transmitted from the transmitter side into a scrambled image signal V4, voice data A, and an encrypted initial value K3, and places the scrambled image signal V4 into the buffer memory 22 for temporary storage, facilitating changes in processing speed. The scrambled image signal V4 stored in the buffer memory 22 is then separated into a variable-length-encoded image signal V3 and a scrambled scalar quantumizing number D6. Subsequently, the variable-length-encoded image signal V3 is converted to a scrambled scalar quantumizing number D6 and an encoded image comprising a block type D2, a motion compensation vector D3, effective data D4, and the number of zero-runs D5 by a variable length decoder 24.

The decryptor 27 decrypts the encrypted initial value K3 and outputs an initial value K1. Using the initial value K1 as an input, the PN generator 28 generates a series of PN signals K2. The adder 29 adds the series of PN signals K2 and the scrambled scalar quantumizing number D6 to each other, and outputs a descrambled scalar quantumizing number D1.

Using the scalar quantumizing number D1, the DCT decoder 25 decodes the encoded image D2, D3, D4, and D5 by decoding for run-length, scalar quantumizing, predictive transform, and DCT-decoding. The DCT decoder 25 outputs a digital image signal V2'. The digital image signal V2' is then converted to an analog image signal V1' and output by the D/A converter 26.

As described above, the present invention involves making a communication system scrambler and descrambler by adding a series of PN signals K2 to a scalar quantumizing number D1 and allowing only a receiver qualified (e.g., keyed) to decrypt the PN initial value, (for example, a subscriber of a toll communication system) to duplicate the original image signal by decrypting the scalar quantumizing number and decoding the image. A receiver not properly keyed to decrypt the encrypted signals, (for example, a non-subscriber to the toll communication system) cannot restore the scalar quantumizing number and can obtain only an incomplete image signal. Such image signal provides an image having block-shaped brightness areas or an unfocused image. Therefore, the invention can impede use by a non-subscriber and may cause non-subscribers to subscribe to the toll system for use of the composite image signals broadcast or communicated over the toll communication system.

As clearly understood from the above-mentioned explanation, an image signal scrambling apparatus according to the invention can provide secrecy for an image signal, since it makes a digital image signal into a scalar quantumizing number and a plurality of encoded signals, adds a series of PN signals to the scalar quantumizing number, variable-length-encodes the encoded signals, then combines these variable-length encoded signals and the scrambled scalar quantumizing number. The apparatus according to the invention provides a scrambled image signal by adding only a PN generator and a framing means to an existing compression encoding apparatus. The apparatus provides a higher degree of security by encrypting a PN initial value used in generating a series of PN signals and framing the encrypted initial value with the image signal.

The above-mentioned exemplary embodiment is an example of a preferred embodiment of the invention, the invention is not limited to this example but can be modified in various ways without deviating from the spirit of the invention.

What is claimed is:

1. An image signal scrambling apparatus comprising;
   a DCT-encoding means for encoding a digitized image signal and outputting encoded information containing a block type, a motion compensation vector, effective data, the number of zero-runs and a scalar quantumizing number signal;
   a variable-length-encoding means for variable-length-encoding at least one of the block type, the motion compensation vector, the effective data, and the number of zero-runs;
   an initial value generating means for generating an arbitrary PN initial value,
   a PN generating means for generating a series of PN signals based on the PN initial value,
   an adding means for adding the series of PN signals to the scalar quantumizing number signal; and
   a first framing means for composing the variable-length-encoded image signal and an output signal of the adding means.

2. An image scrambling apparatus as claimed in claim 1, further comprising an encrypting means for outputting an encrypted initial value by encrypting the PN initial value and a second framing means for composing the output signal outputted from the first framing means and the encrypted initial value.

3. An image signal descrambling apparatus comprising;
   a first separating means for separating and extracting at least an image signal and a PN initial value from a received composite signal,
   a second separating means for separating the separated image signal into a scalar quantumizing number and a variable-length-encoded image signal,
   a variable-length-decoding means for variable-length-decoding the image signal separated by the second separating means,
   a series-of-PN-signals generating means for generating a series of PN signals from the PN initial value,
   an adding means for adding the scalar quantumizing number and the series of PN signals to each other and outputting a scalar quantumizing number from which a series of PN signals has been removed, and
   a DCT-decoding means for DCT-decoding the variable-length-decoded image signal and the scalar quantumizing number from which the series of PN signals has been removed.

4. An image signal scrambling apparatus comprising:
   a first encoder having an input and first and second outputs, the input being for receiving a digitized image, the first encoder being adapted to output a scalar quantumizing number on the second output;

a number generator having an output;

an adder having a first and second input and an output, the first input being coupled to the second output of the first encoder, and the second input being coupled to the output of the number generator, the adder being adapted to add the first input and the second input and output the result on the adder output;

a first framing circuit having a first and second input and an output, the first input being coupled to the first output of the first encoder, the second input being coupled to the output of the adder; and the first framing circuit being adapted to frame the first and second inputs of the first framing circuit to form a framed output.

5. An apparatus as claimed in claim 4, wherein the number generator has an input for receiving an initial value, said apparatus further comprising an initial value generator having an output coupled to the number generator input.

6. An apparatus as claimed in claim 5, further comprising an encryptor having an input and an output, the encryptor input being coupled to the output of the initial value generator.

7. An apparatus as claimed in claim 6, further comprising a second framing circuit having a first and second input and an output, the first input being coupled to the output of the first framing circuit, the second input being coupled to the output of the encryptor, the second framing circuit being adapted to frame the first and second inputs of the second framing circuit to form a second framed output.

8. An apparatus as claimed in claim 6, further comprising a second encoder having an input and an output, wherein the input of the second encoder is coupled to the first output of the first encoder, and the output of the second encoder is coupled to the first input of the framing circuit, and wherein the first output of the first encoder is not coupled to the first input of the first framing circuit.

\* \* \* \* \*